United States Patent
Kekki et al.

(10) Patent No.: US 7,944,943 B2
(45) Date of Patent: *May 17, 2011

(54) METHOD AND APPARATUS FOR MAC LAYER INVERSE MULTIPLEXING IN A THIRD GENERATION RADIO ACCESS NETWORK

(75) Inventors: Sami Kekki, Helsinki (FI); Jari Isokangas, Tampere (FI); Woonhee Hwang, Helsinki (FI); Sinikka Sarkkinen, Kangasala (FI)

(73) Assignee: Spyder Navigations L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,724

(22) Filed: Apr. 20, 2009

(65) Prior Publication Data

US 2009/0232078 A1 Sep. 17, 2009

Related U.S. Application Data

(63) Continuation of application No. 10/300,668, filed on Nov. 19, 2002, now Pat. No. 7,539,212.

(60) Provisional application No. 60/333,411, filed on Nov. 26, 2001.

(51) Int. Cl.
*H04J 3/22* (2006.01)
*H04J 3/04* (2006.01)
*H04J 3/02* (2006.01)

(52) U.S. Cl. ............... 370/469; 370/536; 370/542

(58) Field of Classification Search .................. None
See application file for complete search history.

(56) References Cited

U.S. PATENT DOCUMENTS

| | | | |
|---|---|---|---|
| 5,065,396 A | | 11/1991 | Castellano et al. |
| 5,293,378 A | * | 3/1994 | Shimizu ................. 370/474 |
| 5,752,193 A | | 5/1998 | Scholefield et al. |
| 5,771,229 A | | 6/1998 | Gavrilovich |
| 5,859,446 A | * | 1/1999 | Nagasu et al. ............ 257/174 |
| 6,081,536 A | * | 6/2000 | Gorsuch et al. ........... 370/468 |
| 6,094,439 A | * | 7/2000 | Krishna et al. ............ 370/445 |
| 6,148,010 A | | 11/2000 | Sutton et al. |
| 6,175,550 B1 | | 1/2001 | van Nee |
| 6,363,058 B1 | | 3/2002 | Roobol et al. |
| 6,393,008 B1 | | 5/2002 | Cheng et al. |
| 6,473,442 B1 | | 10/2002 | Lundsjo et al. |
| 6,477,670 B1 | | 11/2002 | Ahmadvand |
| 6,542,490 B1 | | 4/2003 | Ahmadvand et al. |
| 6,591,303 B1 | * | 7/2003 | Hendel et al. ............. 709/238 |

(Continued)

OTHER PUBLICATIONS

3rd Generation Partnership Project; Technical Specification Group Radio Access Network; QoS optimization for AAl type 2 connections over Iub and Iur interfaces (Release 4); 3G TR 25.934 V4.0.0; Mar. 2003.

(Continued)

*Primary Examiner* — Warner Wong
(74) *Attorney, Agent, or Firm* — Connolly Bove Lodge & Hutz LLP (57) ABSTRACT

A channel inverse multiplexer/multiplexer (IMUX/MUX) (14*a*) of a MAC sublayer (14) of a UTRAN RNC (11) for providing to a UE (18) traffic (communication signals including in general both control and user data) at a higher rate than the UE can accept over a single channel. The channel IMUX/MUX performs inverse multiplexing of traffic for downlink, and multiplexing of traffic on uplink, and does so in a way that is transparent to all other layers/entities of the UTRAN (11 17) and to the UE (18).

19 Claims, 6 Drawing Sheets

U.S. PATENT DOCUMENTS

| | | |
|---|---|---|
| 6,611,515 B1 | 8/2003 | Balachandran et al. |
| 6,647,006 B1 * | 11/2003 | Rasanen ............... 370/345 |
| 6,765,885 B2 | 7/2004 | Jiang et al. |
| 6,816,472 B1 | 11/2004 | Dillon et al. |
| 6,820,231 B2 * | 11/2004 | Lee et al. .............. 714/781 |
| 6,850,540 B1 | 2/2005 | Peisa et al. |
| 6,961,589 B2 | 11/2005 | Pautonnier |
| 7,352,727 B2 | 4/2008 | Beckmann et al. |
| 7,400,649 B2 | 7/2008 | Yi et al. |
| 7,809,028 B2 * | 10/2010 | Tzannes et al. ............ 370/535 |
| 2002/0009067 A1 | 1/2002 | Sachs et al. |
| 2002/0021698 A1 | 2/2002 | Lee et al. |
| 2002/0021714 A1 | 2/2002 | Seguin |
| 2002/0037000 A1 | 3/2002 | Park et al. |
| 2002/0085531 A1 | 7/2002 | Herrmann et al. |
| 2002/0089952 A1 | 7/2002 | Cao et al. |
| 2002/0090000 A1 | 7/2002 | Luddy |
| 2002/0172208 A1 | 11/2002 | Malkamaki |
| 2003/0040320 A1 | 2/2003 | Lucidarme et al. |
| 2003/0095519 A1 | 5/2003 | Kuo et al. |
| 2003/0128665 A1 | 7/2003 | Bernhard et al. |
| 2003/0214935 A1 | 11/2003 | Khan et al. |
| 2005/0007990 A1 | 1/2005 | Beckmann et al. |
| 2005/0013287 A1 | 1/2005 | Wallentin et al. |
| 2005/0152398 A1 | 7/2005 | Shin |

OTHER PUBLICATIONS

3rd Generation Partnership Project; Technical Specification Group Radio Access Network; UTRAN Overall Description (Release 1999); 3GPP TS 25.401 V3.8.0; Sep. 2001.

* cited by examiner

METHOD AND APPARATUS FOR MAC LAYER INVERSE MULTIPLEXING IN A THIRD GENERATION RADIO ACCESS NETWORK

CROSS REFERENCE TO RELATED APPLICATIONS

This application is a Continuation Application of U.S. application Ser. No. 10/300,668, filed Nov. 19, 2002, which claims the benefit of priority from U.S. Provisional Patent Application Ser. No. 60/333,411, filed Nov. 26, 2001, the entire contents of which are incorporated herein in their entireties.

FIELD OF THE INVENTION

The invention relates to services of the media access control (MAC) layer of a radio access network (RAN). More particularly, the invention relates to procedures for mapping one logical channel, by which user or control data are provided to the MAC layer from the radio link control (RLC) layer, to multiple transport channels, by which user or control data are provided by the MAC layer to the physical (PHY) layer.

BACKGROUND OF THE INVENTION

Context

Figure 1:
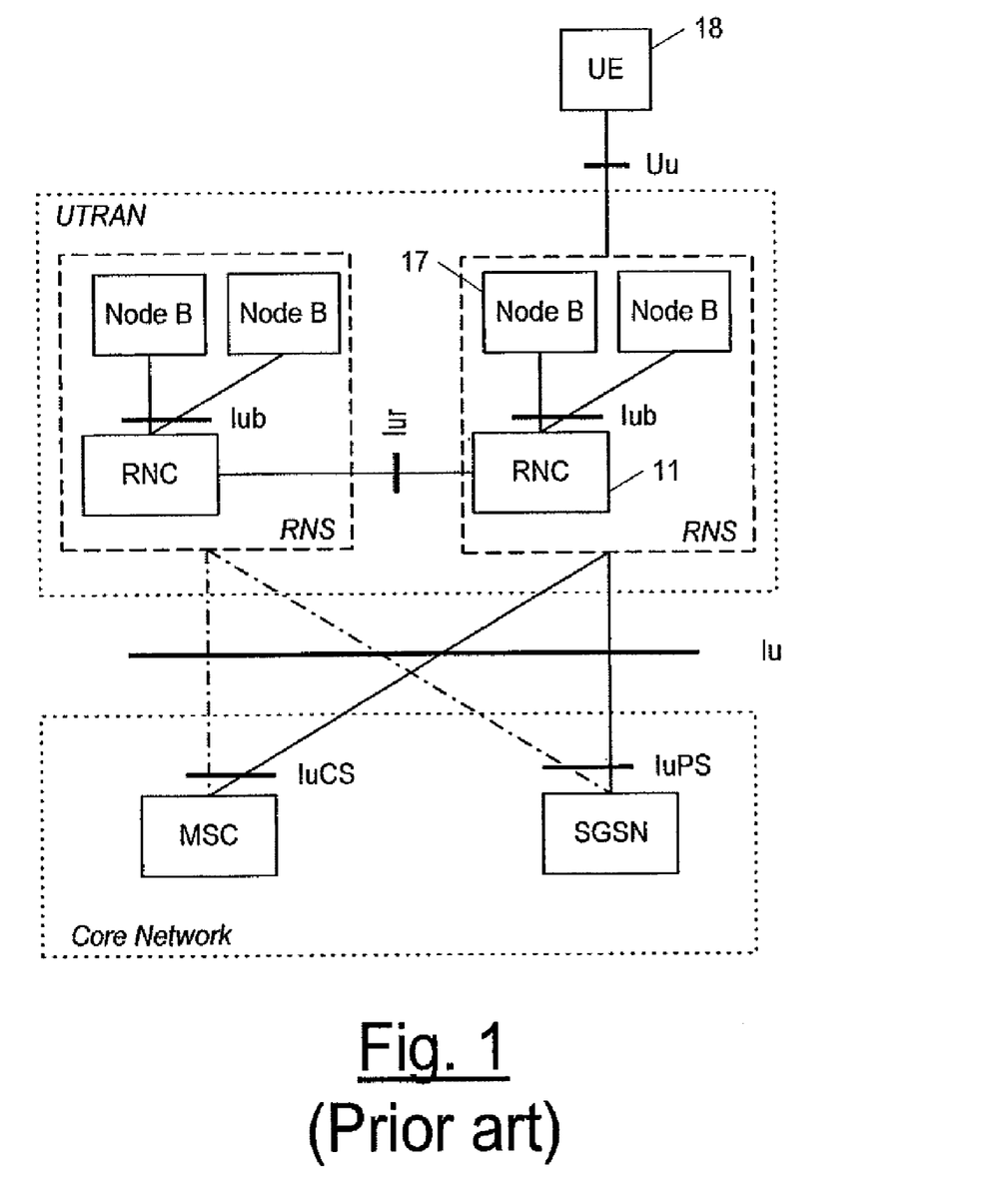
FIG. 1 is block diagram of a wireless communication system of a type in which the present invention can be implemented, including an RNC (radio network controller), a node B, and a UE (user equipment)

As shown in FIG. 1, according to 3G WCDMA (Third Generation Wideband Code Division Multiple Access), in communicating via wireless communication, a mobile user equipment (UE) 18 interfaces with a UTRAN (universal mobile telecommunications system (UMTS) terrestrial radio access network) Node B 17 (also sometimes called a base station) over a so-called Uu interface. The UTRAN Node B in turn communicates with a UTRAN radio network controller (RNC) 11 over a so-called Iub interface, and the RNC communicates with a core network (CN) entity, either a mobile switching center (MSC) or a serving GPRS (general packet radio system) support node (SGSN), over a so-called Iu interface, and also communicates with other RNCs over a so-called Iur interface. The Iu interface is more specifically either an Iu circuit-switched interface IuCS between a UTRAN RNC and an MSC, or an Iu packet-switched interface IuPS between a UTRAN RNC and an SGSN.

Figure 2A:
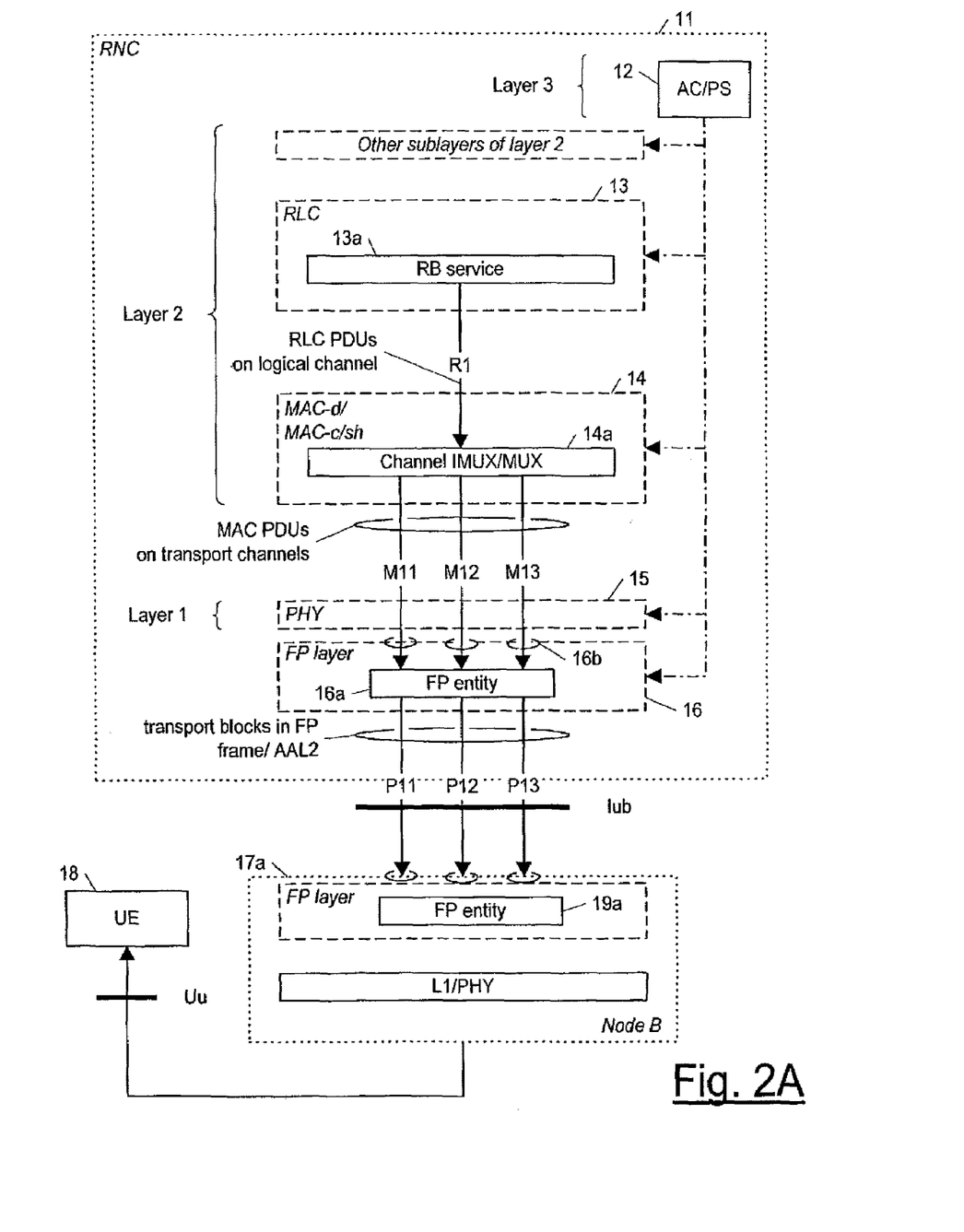
FIG. 2A is a more detailed block diagram of a portion of the wireless communication system of FIG. 1, showing a channel IMUX/MUX (inverse multiplexing/multiplexing) entity of the invention, the node B being configured in a way that does not support HSDPA (high speed downlink packet access)
Figure 2B:
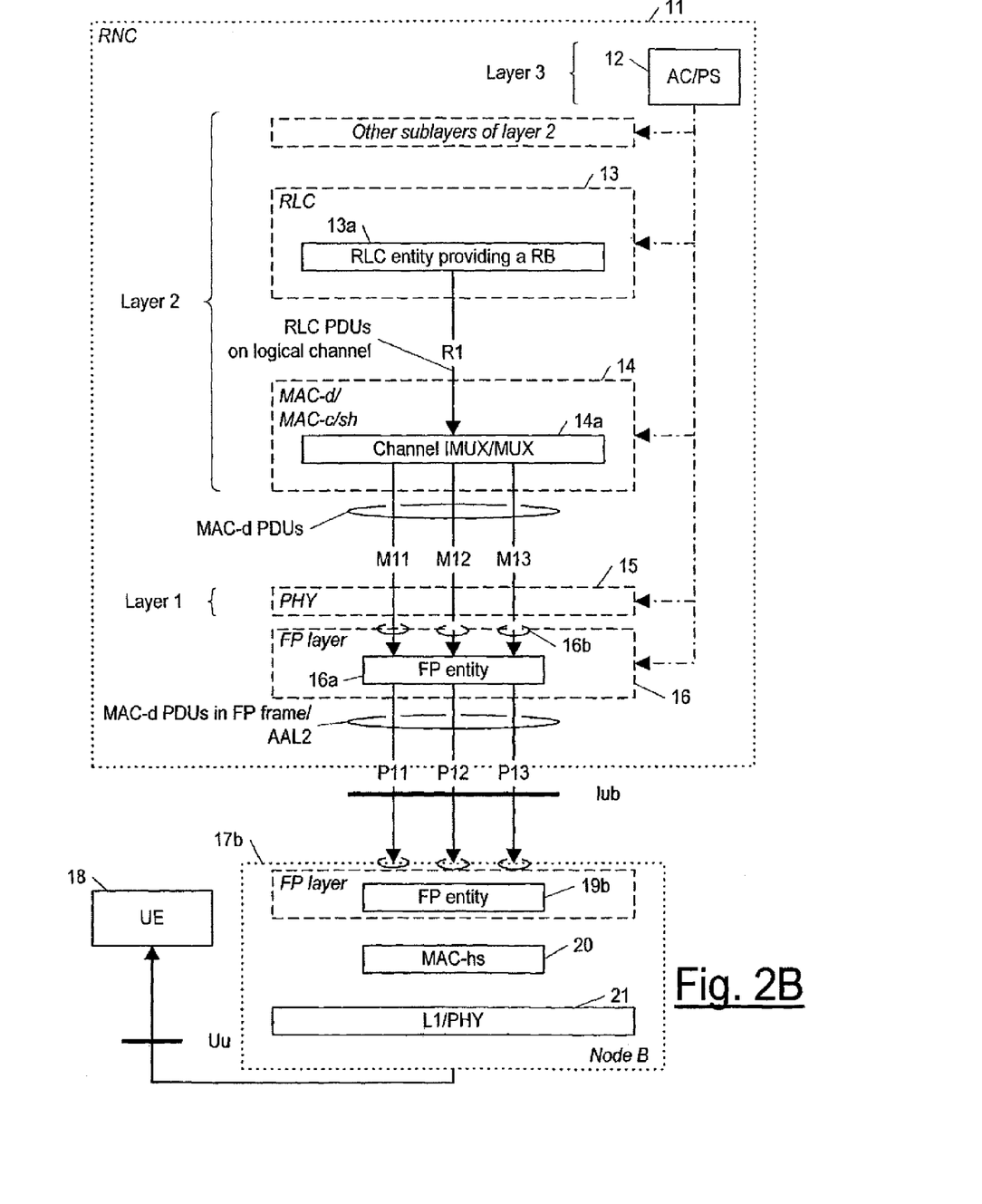
FIG. 2B is another more detailed block diagram of a portion of the wireless communication system of FIG. 1, again showing a channel IMUX/MUX entity of the invention, with the node B here being configured in a way that does support HSDPA.

There are a set of protocols used by a UE and a UTRAN in communicating across the Uu interface which are jointly called the WCDMA protocol; the different protocols making up WCDMA are called protocol layers. The lowest layer, as illustrated in FIG. 2A, is a physical layer (PHY), denominated layer 1 (L1), and resides in the UE, the node B and the RNC, although an MDC (macro-diversity combining) component of L1 does not reside in node B and that component is the only component of L1 that resides in RNC; however, by locating the MDC component of L1 in RNC, soft handover can be supported, during which data coming from different branches are macro-diversity combined in the RNC. A layer 2 (L2) resides in RNC and, in case of configurations supporting HSDPA (High Speed Downlink Packet Access), also resides in node B. See FIG. 2A showing L2 only in RNC and see FIG. 2B showing L2 extended to reside in both RNC and node B as the MAC-hs entity in node B. L2, in general, consists of a media access control (MAC) sublayer and a radio link control (RLC) sublayer, as well as other sublayers not relevant to the invention, such as the PDCP (Packet Data Convergence Protocol) sublayer and the EMC (Broadcast Multicast Control) sublayer. PHY offers transport channels to the MAC sublayer, which in turn offers logical channels to the RLC sublayer.

Note that the data flows from the FP layer over the Iub interface are different in FIG. 2A (showing case for configuration not supporting HSDPA) and FIG. 2B (showing case for configuration supporting HSDPA). A transport channel is defined in UTRAN as a channel between the MAC layer (excluding MDC) and L1, and therefore in a case where HSDPA is not supported, transport channels exist on Iub interface. Also, because Node B in such a case does not contain any L2 functionality, the PDU (Protocol Data Unit), which is transmitted over the Iub interface, is a Transport Block (equal to a MAC PDU), i.e., no additions or changes the MAC PDU/Transport Block are made by Node B.

However, in case of a configuration supporting USDPA, as in FIG. 2B, L2 is extended to the Node B, and if transport channels are defined to be all channels between MAC layer and L1, then in this case the transport channel is a channel between MAC-hs and L1, i.e. it is an internal channel in Node B. On Iub, the data packet is transmitted as a MAC-d PDU, so that the packet is not a complete MAC PDU. Before it is made into a complete MAC PDU, the packet must be processed by MAC-hs, which adds a MAC-hs header at the head of an already existing MAC-d header. Thus, the structure of the PDU is not complete when it comes to the Node B. Therefore there are different names for the data flows from the FP layer over the Iub interface for the case of a configuration supporting HSDPA and one that does not.

Figure 3A:
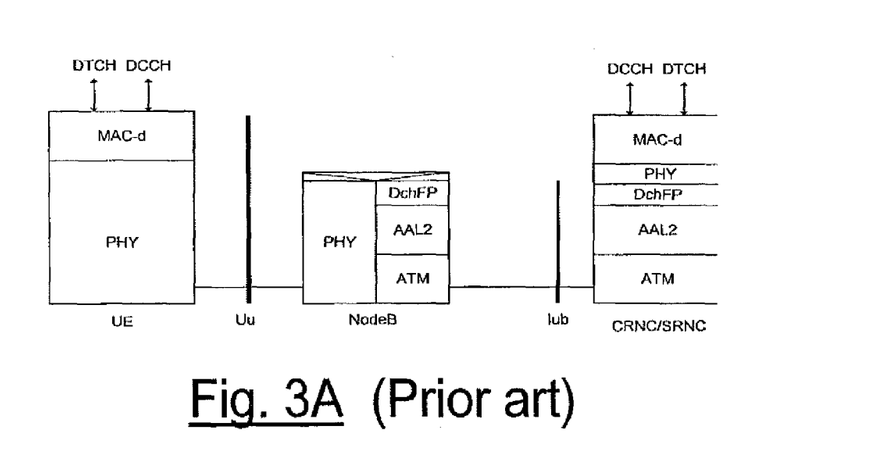
FIGS. 3A and 3B are block diagrams illustrating the protocol stacks for the DCH (dedicated channel) and DSCH (dedicated shared channel), respectively, according to the prior art.
Figure 3B:
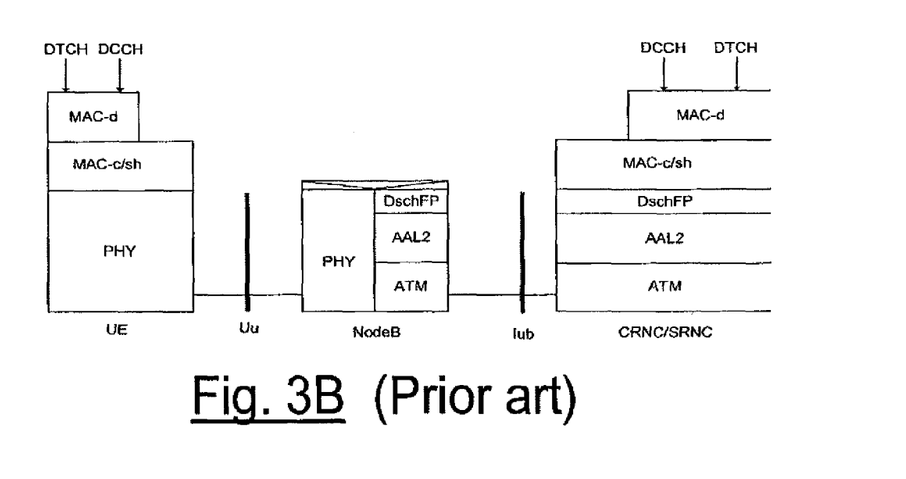
Figure 3C:
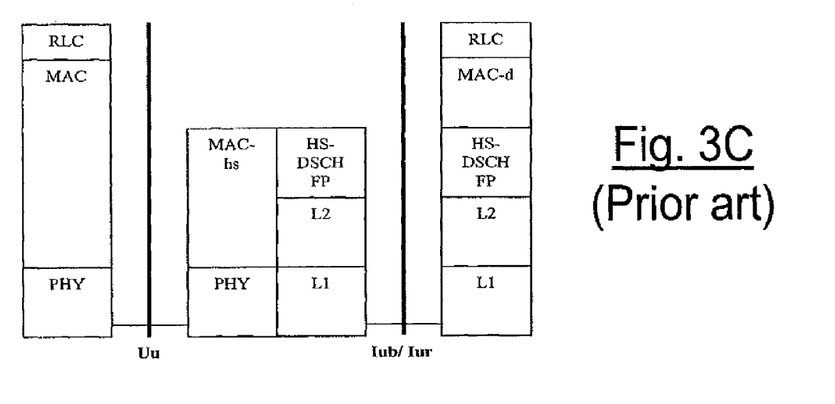
FIG. 3C is a block diagram showing the radio interface protocol architecture of HSDPA without MAC-c/sh, according to the prior art.

The WCDMA FDD (frequency division duplex) communication between a UE and an SRNC through the defined protocol stacks is illustrated in FIGS. 3A-C for three different applications. FIGS. 3A and 3B illustrate the protocol stacks for the DCH (dedicated channel, a transport channel) and DSCH (dedicated shared channel), respectively. The data coming from the DTCH (dedicated traffic channel) and DCCH (dedicated control channel) logical channels are mapped either onto the DCH (as in FIG. 3A) or the DSCH (as in FIG. 3B), using the services of MAC-d or MAC-d/MAC-c/sh, respectively. From the MAC layer, the data are communicated to a Node B using the services of the FP layer. At the node B, the data are provided to the UE over the air interface via the services of L1.

FIG. 3C illustrates the case when the configuration provides support for HSDPA. In this case the data, which is received from the RLC layer by the MAC layer over logical channels, are mapped onto so-called MAC-d data streams using the services of the FP layer. At a Node B, these MAC-d data streams are mapped to physical channels using the services of the MAC-hs and L1. The protocol stacks in FIGS. 3A-C all use, for the TNL (Tranport Network Layer, discussed below) at the Tub and Iur interfaces, the service of ATM (Asynchronous Transmission Mode) and AAL2 (ATM Adaptation Layer Type 2) protocols.

It should be understood that in case of an HSDPA application, such as illustrated in FIG. 3C, the MAC-d data streams correspond to the transport channels at an Iub interface.

Figure 4:
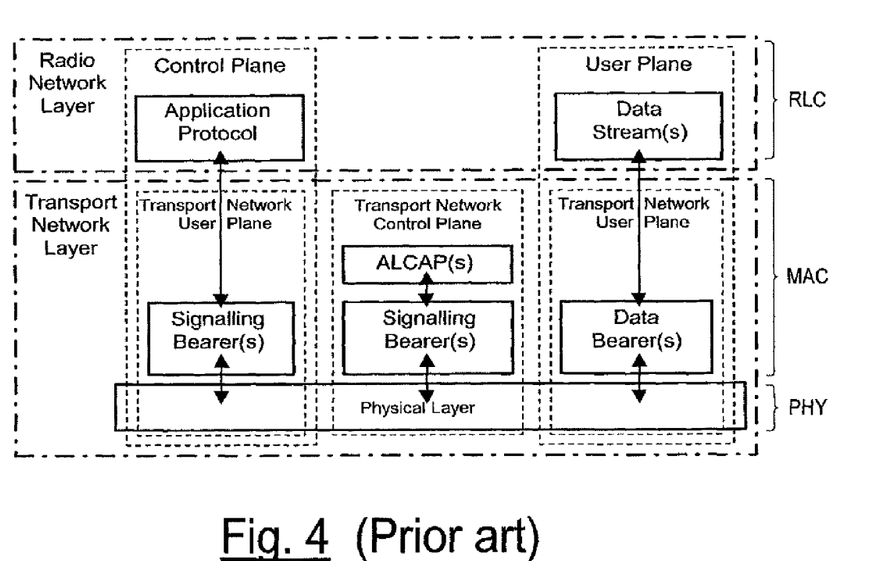
FIG. 4 is a block diagram showing the general protocol model for UTRAN interfaces, consisting of two main (horizontal) layers, the Radio Network Layer (RNL), and the Transport Network Layer (TNL), according to the prior art.

As illustrated in FIG. 4, the general protocol model for UTRAN interfaces consists of two main (horizontal) layers, the Radio Network Layer (RNL), and the Transport Network Layer (TNL). All UTRAN telecom-related issues are visible only in the RNL, and the TNL represents standard transport technology that is selected to be used for UTRAN, but without any UTRAN specific requirements. The RNL includes layers 1-3. The TNL provides the capability of transporting the Frame Protocol PDUs and Application Protocol signalling messages over Iub, Iur, and Iu, using ATM technology.

ATM technology refers not only to ATM protocol but to all related protocols (ATM, AAL2, AAL5) and to any physical transmission appropriate for an ATM interface. The TNL at the Iub interface manages only ATM-related issues. All other functions and protocol layers are handled by the RNL.

As is indicated in FIG. 4, the general protocol model for UTRAN Interfaces also consists of three (vertical) planes: a Control Plane, a Transport Network Control Plane, and a User Plane. The Control Plane includes the so-called Application Protocol and the Signalling Bearer for transporting the Application Protocol messages. Among other services it provides, the Application Protocol is used for setting up bearers (i.e. a Radio Bearer and a Radio Link) for the RNL. In the three-plane structure, the bearer parameters in the Application Protocol are not directly tied to the user plane technology, but are rather general bearer parameters. The Signalling Bearer for the Application Protocol may or may not be of the same type as the Signalling Bearer for the ALCAP (Access Link Control Application Part). The Signalling Bearer is always set up by Operations and Management (O&M) actions (under the direction of an Operations and Management Center or OMC).

The User Plane includes the data streams and the data bearers for the data streams. The data streams are characterized by one or more frame protocols (FPS) specified for that interface.

The Transport Network Control Plane does not include any RNL information, and is completely in the Transport Layer. It includes the ALCAP protocol(s) needed to set up the transport bearers (Data Bearers) for the User Plane. It also includes the appropriate Signalling Bearers needed for the ALCAP protocols.

Also as illustrated in FIG. 4, the Data Bearers in the User Plane and the Signalling Bearers for the Application Protocol both belong to a Transport Network User Plane. (As mentioned, the Data Bearers in Transport Network User Plane are directly controlled by the Transport Network Control Plane during real-time operation, but the control actions required for setting up the Signalling Bearers for Application Protocol are considered O&M actions.) Thus, there is a Control Plane and a User Plane when viewed from the RNL, and a differently constituted (Transport Network) User Plane and (Transport Network) Control Plane when viewed from the TNL.

Figure 5:
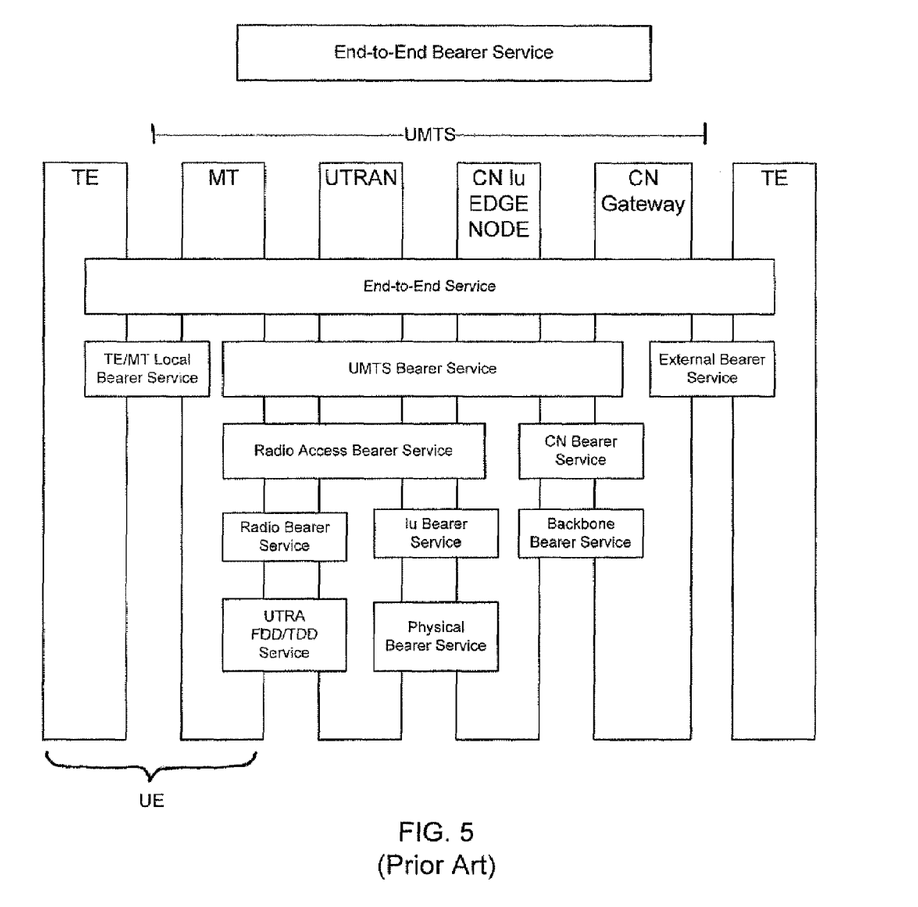
FIG. 5 is a diagram illustrating the End-to-End Bearer Service and the UMTS Bearer Service, according to the prior art.

The End-to-End Bearer Service and the UMTS Bearer Service are illustrated in FIG. 5. On its way from a TE (terminal equipment, and can be part of a UE, as indicated as an MT in FIG. 5) to another TE, the traffic must pass different bearer services of one or more networks A TE is connected to the UMTS network by use of a Mobile Termination (MT), which in combination with the TE makes up a UE. The End-to-End Bearer Service on the application level uses the bearer services of the underlying networks, and is conveyed over several networks, not only the UMTS network. The End-to-End Bearer Service used by a TE is realized using a TE/MT Local Bearer Service, a UMTS Bearer Service, and an External Bearer Service.

THE PROBLEM SOLVED BY THE INVENTION

According to 3GPP TSG RAN specifications (such as e.g. 3GPP TS 25.401), when an RNC is communicating with a Node B so as to ultimately communicate with a mobile phone, (see FIG. 2), each transport channel is conveyed across an Iub interface by a dedicated AAL2 connection (see FIG. 3), which is provided to a Frame Protocol (FP) layer 16 (see FIG. 2). An AAL2 connection is one realization of a transport bearer in UTRAN. The FP layer 16 is a part of the RNL, whereas the AAL2 is a part of the TNL. The WCDMA L1, as a part of the RNL, can provide macrodiversity for the data streams when they are in soft handover; in other words, the WCDMA L1 can handle the same UE data streams from two different Node Bs. Otherwise, the WCDMA L1 of the RNL is transparent to the data stream, i.e. the WCDMA L1 of the RNL does not in any way affect or process the data stream if the mobile phone is not in soft handover. (This is a simplification and may not always be true; the WCDMA L1 is always doing processing like interleaving/deinterleaving and channel coding/decoding in the Node B for each data stream.)

Note that there is an L1 for the RNL (WCDMA Layer 1), which handles macrodiversity and there is an L1 functionality for the TNL (TNL Layer 1), which handles the physical transmission below the ATM protocol on TNL. The RNL/TNL protocol stack cannot be compared with the seven-layer open systems interconnect (OSI) model.

The specifications further provide that the transport bearers (i.e. AAL2 connections in case of ATM transport) are controlled (set up, released, modified) by an AAL2 signaling protocol, which allows transport bearers to have a bit rate of up to a maximum of 2048 kbit/s. In UTRAN Rel5 (release 5), transport channels are specified that can exceed the 2048 kbit/s maximum rate of the AAL2 signaling protocol.

Therefore, what is now needed (because of release 5) is a way to enable a UTRAN (and more specifically an RNS) to use the AAL2 signaling protocol with transport channels conveying user and/or control data at bit rates in excess of the maximum of 2048 kbit/s, or in other words, a way to provide an AAL2 connection with (high capacity) radio bearers per UTRAN Rel5. Ideally, what would be provided could be used at both an Iub interface and an Iur interface.

SUMMARY OF THE INVENTION

Accordingly, a first aspect of the invention provides a radio network element for communicating to a mobile user equipment (UE) a higher rate data flow received from a core network (CN) entity, the higher rate data flow being provided to the radio network element at a higher rate than the UE can accept on a single channel, the radio network element characterized by: a radio link control (RLC) sublayer including a radio bearer service, responsive to the higher rate data flow, for providing a corresponding RLC data flow for downlink to the UE; a media access control (MAC) sublayer, responsive to the RLC data flow, for providing a plurality of corresponding MAC data flows at a rate low enough to be acceptable to the UE; a framing protocol layer (FP layer), responsive to the MAC data flows, for providing corresponding transport network layer data flows; and an admission control (AC), responsive to radio access bearer parameters provided by the CN entity, for providing commands to the MAC sublayer specifying how the MAC sublayer is to allocate resources so as to communicate the higher rate data flow to the UE; and further characterized by the MAC sublayer in the radio network element including a channel inverse multiplexer/multiplexer (IMUX/MUX), responsive to the RLC data flow, for providing the plurality of corresponding MAC data flows at a rate low enough to be acceptable to the UE, and for including with each lower rate data flow information indicating how the lower rate flows are to be combined by the UE, the lower rate data flows being suitable for transmission by the FP layer according to a standard protocol not taking into account that the lower rate data flows are in combination the RLC data flow corresponding to the higher rate data flow.

In accord with the first aspect of the invention, in sending to a CN entity a plurality of transport network data flows received from the UE, the channel IMUX/MUX may be further responsive to a plurality of corresponding MAC data flows, and may provide, at the direction of the AC, a single corresponding RLC data flow for transmission to the CN entity as a higher rate data flow.

In a second aspect of the invention, a radio access network is provided including a Node B and also including a radio network element in accord with the first aspect of the invention.

In a third aspect of the invention, a method if provided by which a radio network element communicates to a mobile user equipment (UE) a higher rate data flow received from a core network entity, the higher rate data flow being provided to the radio network element at a higher rate than the UE can accept on a single channel, the method characterized by: a step in which a radio link control (RLC) sublayer including a radio bearer service, responsive to the higher rate data flow, provides a corresponding RLC data flow for downlink to the UE; a step in which a media access control (MAC) sublayer, responsive to the RLC data flow, provides a plurality of corresponding MAC data flows at a rate low enough to be acceptable to the UE; a step in which a framing protocol layer (PP layer), responsive to the MAC data flows, provides corresponding transport network layer data flows; and a step in which an admission control (AC), responsive to radio access bearer parameters provided by the CN entity, provides commands to the MAC sublayer specifying how the MAC sublayer is to allocate resources so as to communicate the higher rate data flow to the UE; and further characterized in that the MAC sublayer in the radio network element performs a channel inverse multiplexing/multiplexing using a channel inverse muliplexer/multiplexer (IMUX/MUX), responsive to the RLC data flow, and in so doing provides the plurality of corresponding MAC data flows at a rate low enough to be acceptable to the UE, and includes with each lower rate data flow information indicating how the lower rate flows are to be combined by the UE, the lower rate data flows being suitable for transmission by the FP layer according to a standard protocol not taking into account that the lower rate data flows are in combination the RLC data flow corresponding to the higher rate data flow.

In accord with the third aspect of the invention, in sending to a CN entity a plurality of transport network data flows received from the UE, the channel IMUX/MUX may be further responsive to a plurality of corresponding MAC data flows, and may provide, at the direction of the AC, a single corresponding RLC data flow for transmission to the CN entity as a higher rate data flow.

It should be understood that as the description to follow will show, nothing about the invention restricts its application to the Iub interface; it is just as applicable to the Iur interface. For the Iur interface, the demultiplexing (i.e. inverse multiplexing)/multiplexing is done for communication between a MAC-d in a SRNC and a MAC-c/sh in a CRNC, but the invention is otherwise as applied to the Iub interface, i.e. the invention is fundamentally unchanged: for data rates exceeding 2048 kbit/s, using a plurality of AAL2s for a single logical channel.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Referring now to FIGS. 2A and 2B, the invention is a channel inverse multiplexer/multiplexer (IMUX/MUX) 14*a* implemented in a UTRAN RNC 11, and is of use when the RNC 11 sends across an Iub interface to a Node B 17*a* 17*b* downlink data traffic/flow P11 P12 P13 (conveying control and user traffic, in general) for subsequent delivery by the Node B to a UE 18 (across a Uu interface), the RNC receiving the data traffic/flow it conveys to the Node B from a CN entity (not shown), such as an MSC or a SGSN.

According to the invention, when data traffic is to be communicated by the RNC 11 to the Node B 17, a so-called Admission Control/Packet Scheduler (AC/PS) module 12 (the PS aspect providing packet data related functionalities in connection with packet switched connections from a SGSN), implemented in layer 3 (L3) of the RNC, sets up multiple transport channels (TrCHs) to be used in providing a single radio bearer (RB) service whenever the data rate for the RB would otherwise exceed some predetermined maximum data rate, such as 2 Mbits/s. In setting up TrCHs for communicating user packets (i.e. for a packet-switched connection), the AC/PS may use radio access bearer (RAB) parameters (see FIG. 5) it receives from the CN as a basis for defining the resources specified for the RAB, including the maximum data rate for the connection. For clarity, the transmission of the RAB parameters to the AC/PS module 12 is not shown in FIG. 2.

Along with the number of TrCHs, AC/PS also defines an equal number of Transport Format Sets (TFSs) and Transport Format Combination Set (TFCS) in which the use of multiple TrCHs is taken into account. The TFSs and TFCS so defined are indicated to the MAC sublayer 14 when configuring the MAC sublayer to use demultiplexing (i.e. inverse multiplexing) for downlink and multiplexing for uplink, i.e. when engaging the (transport) channel IMUX/MUX 14*a* of the MAC sublayer. Configuring the MAC sublayer is one subtask in the overall task of configuring the RB service in the UTRAN. (See FIG. 5.) The inverse multiplexing according to the invention is thus performed in the RNL, not in the TNL. (See FIG. 4 to compare the RNL to the TNL.)

Referring still to FIGS. 2A and 2B, in conveying data traffic from the RNC to the Node B 17a 17b for a UE 18 (FIGS. 2A 2B), the RLC sublayer 13 creates one or more RLC entities 13a each for providing a radio bearer (RS) for the UE, based on parameters assigned for the RBs by AC/PS. The RLC sublayer 13 then provides the RNC data traffic as a series R1 of RLC PDUs on a logical channel provided by the MAC sublayer 14. The channel IMUX/MUX 14a takes the R1 series of RLC PDUs and submits them to the FP layer 16 (via PHY, i.e. L1) using a plurality of service access points (SAPs) 16b corresponding to the plurality of transport channels between the MAC layer and the FP layer, with the distinction according to the invention that the series R1 is divided up into a corresponding plurality of MAC data flows M11 M12 M13 (each MAC data flow being a series of MAC PDUs, i.e. transport blocks, each according to a transport format (TF). The FP layer 16 includes an FP entity 16a, corresponding to the RB service 13a, which accepts the MAC PDUs, packages them into FP frames and forwards them to the TNL where AAL2 packets are created. The next step is to communicate these MAC data flows to the Node B 17a 17b as TNL data flows (transport bearers) P11 P12 P13 (series of transport blocks in FP frames).

Still referring to FIGS. 2A and 2B, the dash-dot data flows lines issuing from the AC/PS module 12 represent internal signaling connections between the AC/PS and each of the protocol layers 13 14 15 16, as opposed to the user data indicated by the solid data flows R1, M11, . . . , and P11, . . . . In the Node B 17a 17b across the Iub interface, there is an FP entity 19a 19b that is the peer of the FP entity 16b in the FP layer 16 of the RNC 11; in the Node B 17a 17b, the FP entity 19a 19b forwards the received Transport Blocks P11 P12 P13 to L1, which transmits them to the UE 18 through the air interface. Thus, in the RNC 11, the transport blocks P11 P12 P13 are communicated as FP data frames (each containing one or more transport blocks), and delivered to the node B 17b via the TNL. In FIG. 2B, the peer entity of the MAC-hs entity 20 (in the node B 17b) resides in the UE 18.

The operation of the channel IMUX/MUX module 14a is transparent to the RLC 13 and to the FP entity 16a, as well as to the TNL generally. The MAC data flows M11 M12 M13 include all the information (in the way of transport format descriptors) needed by the UE 18 to reconstruct the original data traffic from the CN entity that is the source of the data being sent to the UE 18.

Referring still to FIG. 2, it should be understood that a single FP entity 16a could be assigned multiple TrCHs, as indicated in FIG. 2 (and indicated by the notation P11 P12 P13), so that only one FP entity 16a is assigned for the RB provided by the RB service 13a, or, instead, each TrCh can be assigned a dedicated FP entity which would then provide its own FP traffic flow (as a physical channel). In the latter case, the number of FP data traffic flows must be signaled to the Node B, which would then see each TrCH/FP traffic flow as a separate data traffic flow.

The invention thus provides that an RNC split (i.e. inverse multiplex) into component (sub) channels a high speed transport channel (e.g. the high speed dedicated shared channel, denominated as HS-DSCH, or the dedicated channel, denominated as DCH) for communication to a UE via a Node B, each component (sub) channel having a bit rate less than a predetermined maximum (e.g. each smaller than 2048 kbit/s).

It further provides that the RNC combine (i.e. multiplex) traffic on a plurality of channels be into traffic for a single high speed transport channel for communication to a CN entity.

It should be understood that although the invention has been shown and described here for downlink only, the invention is also of use for uplink. Implementing the invention for uplink is similar to what is described here for downlink, but the data is received over the air interface by a Node b, and from the Node B the data is transmitted through multiple TrCHs to an RNC.

It is to be further understood that the above-described arrangements are only illustrative of the application of the principles of the present invention. Numerous further modifications and alternative arrangements besides those indicated above may be devised by those skilled in the art without departing from the scope of the present invention, and the appended claims are intended to cover such modifications and arrangements.

What is claimed is:

1. A radio network element, comprising:
an admission control unit, responsive to radio access bearer parameters provided by a core network entity, to provide commands to a media access control sublayer specifying how the media access control sublayer is to allocate resources so as to communicate a higher rate data flow received from the core network entity to a mobile user equipment, the higher rate data flow being provided to the radio network element at a higher rate than the user equipment can accept on a single channel; and
the media access control sublayer to provide a plurality of media access control data flows at a rate low enough to be suitable for reception by the user equipment, and to include with each lower rate data flow information indicating how the lower rate flows are to be combined by the user equipment,
wherein the lower rate data flows are suitable for transmission according to a protocol not taking into account that the lower rate data flows are in combination with a radio link control data flow corresponding to the higher rate data flow.

2. The radio network element of claim 1, further comprising:
a radio link control sublayer, responsive to the higher rate data flow, to provide a radio link control data flow for downlink to the user equipment; and
a framing protocol layer, responsive to the media access control data flows, to provide corresponding transport network layer data flows.

3. The radio network element of claim 1, wherein in sending a plurality of transport network data flows received from the user equipment in an uplink direction, the media access control sublayer is configured to provide a single corresponding radio link control data flow for transmission to the core network entity as a higher rate data flow.

4. The radio network element of claim 1, wherein the radio access network is configured to transmit the plurality of media access control data flows in a downlink direction to a base station.

5. The radio network element of claim 1, the admission control unit is configured to set up a plurality of transport channels to provide a single radio bearer service when a data rate for the radio bearer exceeds a predetermined data rate.

6. The radio network element of claim 1, wherein the admission control unit is configured to use radio access bearer parameters received from the core network to define resources specified for a radio access bearer, including a maximum data rate for the connection.

7. A method, comprising:
responsive to radio access bearer parameters provided by a core network entity, providing a command specifying how resources are to be allocated so as to communicate a higher rate data flow received from the core network entity to a mobile user equipment, the higher rate data flow being provided at a higher rate than the user equipment can accept on a single channel;
responsive to the command, providing a plurality of media access control data flows at a rate low enough to be suitable for reception by the user equipment; and
including with each lower rate data flow information indicating how lower rate flows are to be combined by the user equipment to reconstruct an original data traffic from the core network entity, wherein the lower rate data flows are suitable for transmission according to a protocol not taking into account that the lower rate data flows are in combination with a radio link control data flow corresponding to the higher rate data flow.

8. The method of claim 7, further comprising:
responsive to the higher rate data flow, providing a radio link control data flow for downlink to the user equipment.

9. The method of claim 7, further comprising providing a single radio link control data flow for transmission to the core network entity as a higher rate data flow during transmission of a plurality of transport network data flows received from the user equipment in an uplink direction.

10. The method of claim 7, further comprising transmitting the plurality of corresponding media access control data flows in a downlink direction to a base station.

11. The method of claim 7, further comprising creating at least one radio link control entity, each radio link control entity being for providing a radio bearer for the user equipment based on parameters assigned from the radio bearers; and
using radio access bearer parameters received from the core network to define resources specified from a radio access bearer, including a maximum data rate for the connection.

12. The method of claim 7, further comprising setting up a plurality of transport channels to provide a single radio bearer service when a data rate for a radio bearer exceeds a predetermined data rate.

13. A system, comprising:
a radio network controller including a media access control sublayer to provide a plurality of media access control data flows for communication to a user equipment, each of the media access control data flows being at a lower rate than a first rate, in response to a radio link control data flow from a core network entity at the first rate, and to include with each lower rate data flow information indicating how media access control data flows are to be combined by the user equipment; and
a base station communicatively coupled to the radio network controller, for wirelessly communicating the media access control data flows to the user equipment according to a wireless communication protocol,
wherein the lower rate data flows are suitable for transmission according to a protocol not taking into account that the lower rate data flows are in combination with a radio link control data flow corresponding to the higher rate data flow.

14. The system of claim 13, wherein in sending a plurality of transport network data flows received from the user equipment in an uplink direction, the media access control sublayer is configured to provide a single corresponding radio link control data flow for transmission to the core network entity as a higher rate data flow.

15. The system of claim 13, further configured to transmit the plurality of media access control data flows in a downlink direction to the base station.

16. The system of claim 14, further comprising an admission control unit, responsive to radio access bearer parameters provided by the core network entity, to provide commands to the media access control sublayer specifying how the media access control sublayer is to allocate resources so as to communicate the higher rate data flow received from the core network entity to a mobile user equipment, the higher rate data flow being provided at a higher rate than the user equipment can accept on a single channel.

17. The system of claim 16, wherein the admission control unit is configured to set up a plurality of transport channels to provide a single radio bearer service when a data rate for the radio bearer exceeds a predetermined data rate.

18. The system of claim 16, wherein the admission control unit is configured to use radio access bearer parameters received from the core network to define resources specified for a radio access bearer, including a maximum data rate for a connection.

19. The system of claim 13, further comprising:
a radio link control sublayer, responsive to the higher rate data flow, to provide a radio link control data flow for downlink to the user equipment; and
a framing protocol layer, responsive to the media access control data flows, to provide corresponding transport network layer data flows.

\* \* \* \* \*